United States Patent
Lyon

(10) Patent No.: US 7,844,406 B2
(45) Date of Patent: Nov. 30, 2010

(54) LEVEL MEASUREMENT SYSTEM

(75) Inventor: George Quinton Lyon, Peterborough (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 151 days.

(21) Appl. No.: 12/283,925

(22) Filed: Sep. 16, 2008

(65) Prior Publication Data

US 2009/0088987 A1 Apr. 2, 2009

(30) Foreign Application Priority Data

Sep. 20, 2007 (EP) .................................. 07018501

(51) Int. Cl.
*G06F 19/00* (2006.01)
*H04B 1/06* (2006.01)
*G01R 27/32* (2006.01)

(52) U.S. Cl. ........................ 702/55; 367/135; 324/644

(58) Field of Classification Search .................. 702/54, 702/55; 367/135; 73/290 R; 324/644
See application file for complete search history.

(56) References Cited

U.S. PATENT DOCUMENTS

| 4,700,569 | A | 10/1987 | Michalski et al. |
| 6,295,874 | B1 | 10/2001 | Strutt et al. |
| 7,583,562 | B2* | 9/2009 | Lyon ........................... 367/135 |
| 2004/0124854 | A1* | 7/2004 | Slezak ......................... 324/644 |
| 2004/0183550 | A1 | 9/2004 | Fehrenbach et al. |

FOREIGN PATENT DOCUMENTS

| GB | 2 342 996 A | 4/2000 |
| WO | WO 96/07875 A1 | 3/1996 |

* cited by examiner

*Primary Examiner*—Bryan Bui

(57) ABSTRACT

To provide a simpler and less expensive system for multipoint level measurement, a level measurement system with at least two sensor devices operating in accordance with the pulse-echo principle and being connected via a communication network to a central signal processing device is provided. The computation-intensive evaluation of echo profiles for calculating distances or ranges is thus shifted from the sensor devices at the measurement locations or sites to the central signal processing device.

20 Claims, 4 Drawing Sheets

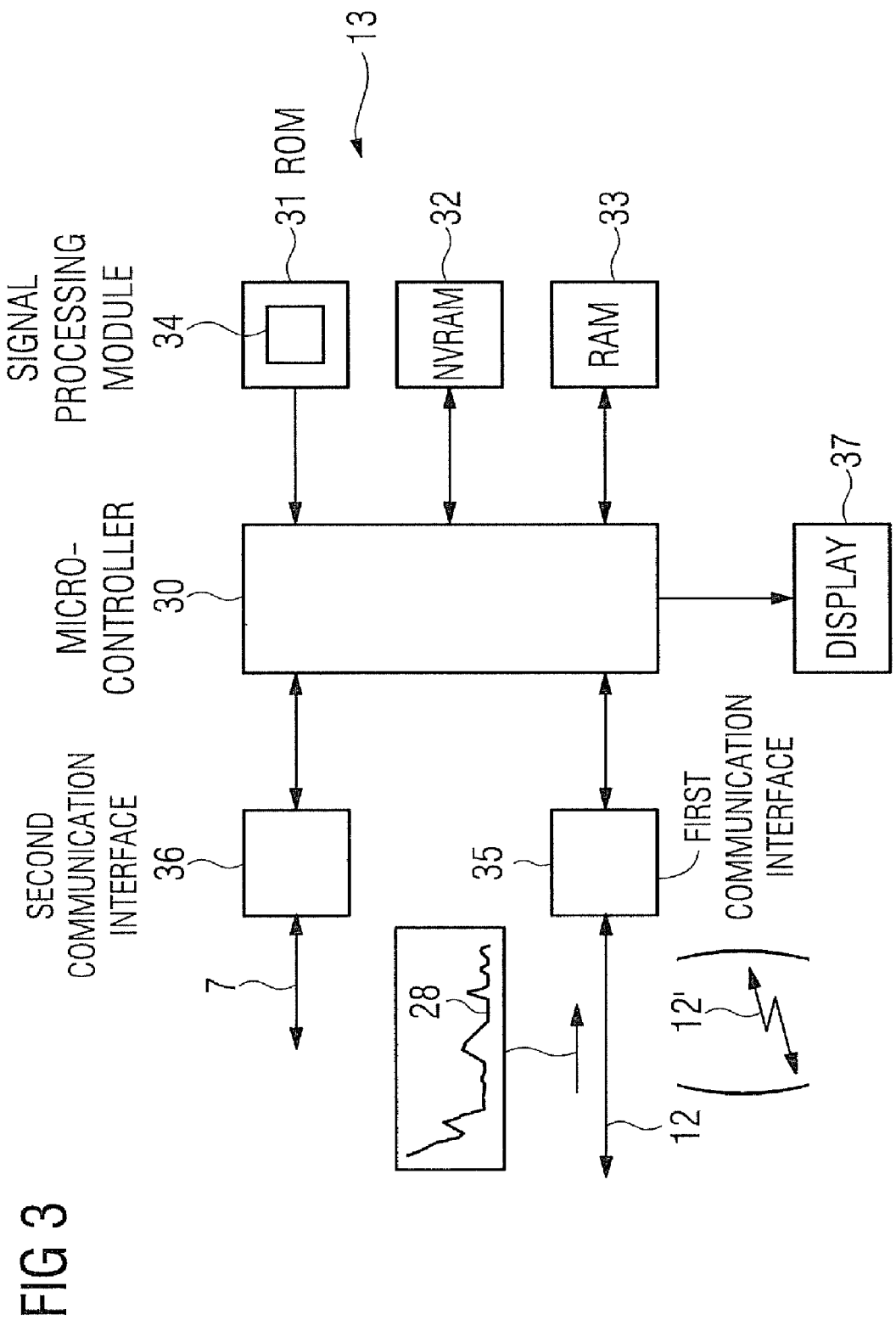

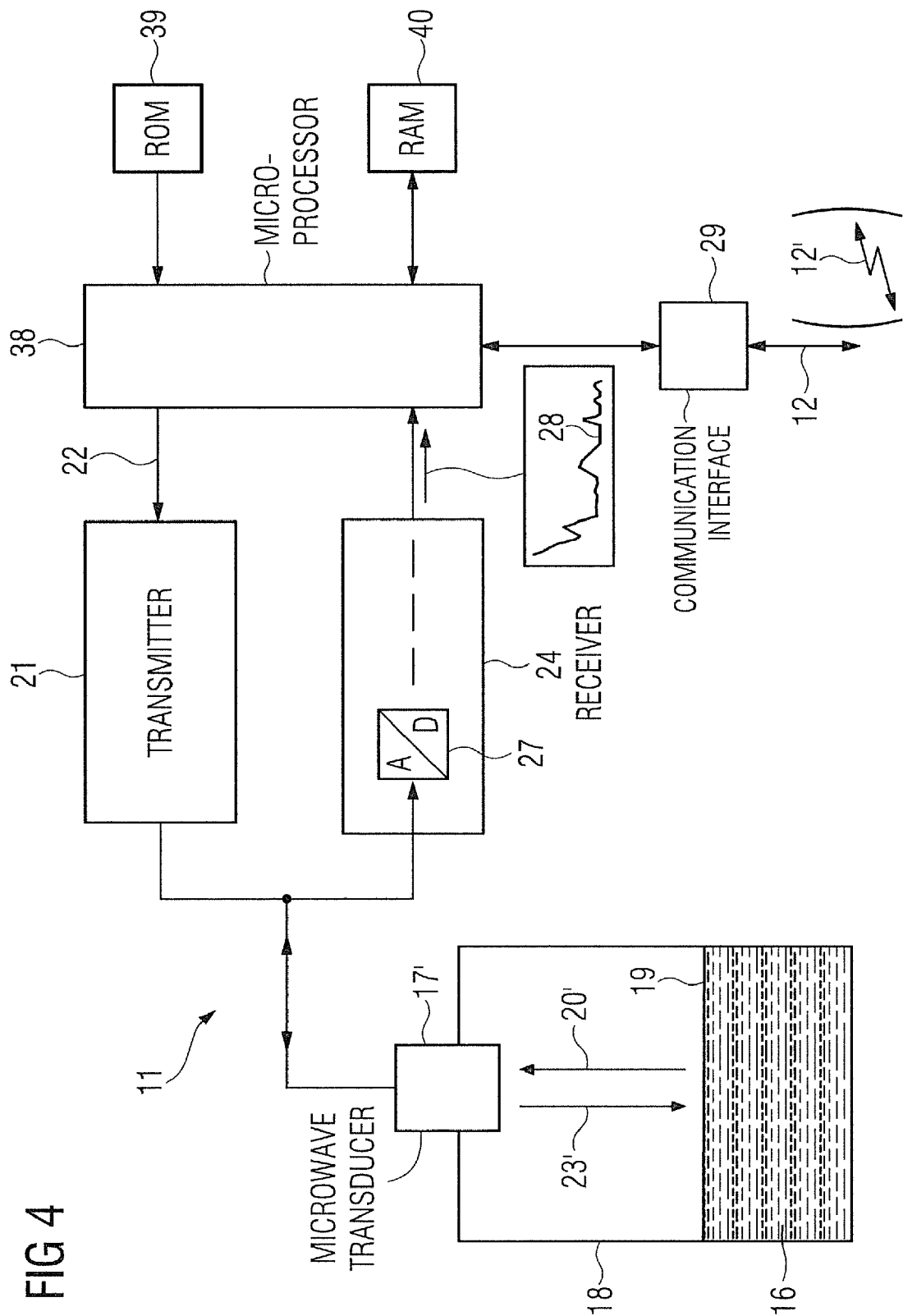

LEVEL MEASUREMENT SYSTEM

CROSS REFERENCE TO RELATED APPLICATIONS

This application claims priority of European Patent Office application No. 07018501.2 EP filed Sep. 20, 2007, which is incorporated by reference herein in its entirety.

FIELD OF INVENTION

The present invention relates to a level measurement system.

BACKGROUND OF INVENTION

In level measurement applications, pulse-echo ranging devices, also known as time-of-flight ranging devices, are commonly used for determining the distance to a target object (e.g. reflective surface of a material in a container) by measuring how long after transmission of a burst of energy pulses the reflected pulses or echoes are received. Such devices typically use ultrasonic pulses or pulsed radar or microwave signals.

Pulse-echo acoustic ranging devices generally include a transducer and a signal processor. The transducer serves the dual role of transmitting the energy pulses and receiving the reflected energy pulses or echoes. An echo profile is generated from the received energy pulses by amplifying, filtering and envelope shaping, wherein in some point an analog-to-digital conversion is performed. Echo pulses are identified in the digital echo profile by a signal processor, and the distance or range of the target is calculated based on the transmit times of the transmitted energy pulses and the identified echo pulses. The calculated distance or range is then transmitted via a communication network to a process control system using a communications protocol such as analog 4-20 mA, HART, PROFIBUS or FOUNDATION Fieldbus.

When measurements at different points of the same surface of, e.g., a bulk material or at different locations or sites are required, one complete device is needed for each measurement, which can be very expensive.

SUMMARY OF INVENTION

It is therefore an object of the invention to provide a simpler and less expensive system for multipoint level measurement.

According to the invention this object is achieved by the level measurement system defined in an independent claim.

Preferred embodiments of the method according to the invention are specified in the remaining claims.

A computation-intensive evaluation of the echo profiles for calculating distances or ranges is shifted from the sensor devices at the measurement locations or sites to the central signal processing device. The sensor devices consist only of the minimum components required for emitting and receiving the energy pulses and for providing and transmitting a digitized echo profile to the central signal processing device. Thus, the individual sensor devices are less complex and expensive and also require less energy than complete field devices. The communication network for transmitting the echo profiles to the central signal processing device may be, but does not need to be, of a standard industrial type such as PROFIBUS, FOUNDATION Fieldbus and Ethernet. It can be of any convenient network topology, such as daisy chain or multidrop, and is not limited to be wired but also may be wireless.

The echo profiles may be digitized before they are transmitted to the central signal processing device.

It is also possible to transmit analog samples of the respective echo profiles in a manner so as not to interfere with the analog echo profiles from other sensor devices connected to the same communication network. The encoding scheme may then be a current loop, frequency modulation or any other modulation scheme where signal amplitude is represented by an analog coding scheme. The sensor devices located at measurement points cooperatively transmit their echo profiles according to the network protocols and thereby eliminate interference with each other. Typically, such cooperation requires that the devices are operated in a master-slave protocol and the master addresses individual sensor devices by their address. Other networking schemes include the client/server model, in which a sensor device responds to requests from the process controller, and the peer-to-peer model, in which either of two sensors or a sensor and the process controller can initiate a communication session.

Other analog encoding schemes that require less processing capability at the sensor devices are, e.g., frequency modulation where each sensor device is set at a frequency that will not interfere with that of another sensor device or pulse width modulation the pulses are transmitted in pre-allocated time slots.

BRIEF DESCRIPTION OF THE DRAWINGS

The invention will be now described by way of preferred examples and with reference to the accompanying drawing, in which:

FIG. 3 shows a block diagram of the signal processing device and FIG. 4 shows a block diagram of another embodiment of one of the sensor devices.

DETAILED DESCRIPTION OF INVENTION

Figure 1:
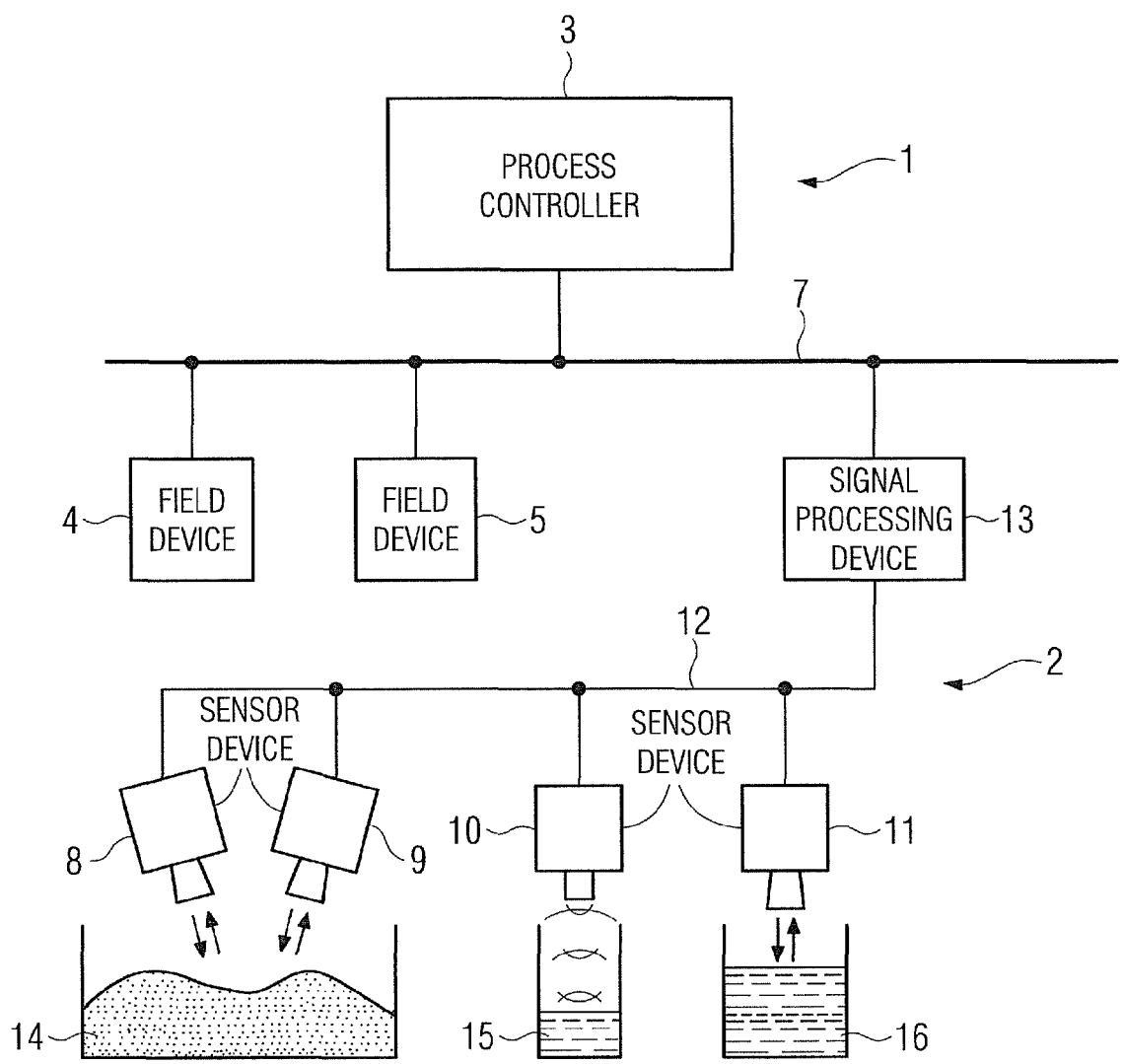
FIG. 1 shows a block diagram of the level measurement system according to the invention comprising a plurality of sensor devices linked by a communication network to a signal processing device.

Reference is first made to FIG. 1 which exemplarily shows a simplified schematic diagram of an industrial process automation system 1 including a level measurement system 2 according to the invention. The process automation system 1 comprises a process controller 3 and a plurality of field devices 4 and 5, such as flow, level and pressure transmitters and control valves, distributed throughout the physical process and communicatively connected together and to the process controller 3 by a superior communication network 7. The level measurement system 2 itself forms from the process automation system's 1 perspective another field device. The level measurement system 2 comprises several sensor devices 8, 9, 10, 11 which operate in accordance with the pulse-echo principle. The sensor devices 8, 9 and 11 are radar based whereas the sensor device 10 uses ultrasonic pulses. The sensor devices 8, 9, 10, 11 are located at different measurement locations and connected via a communication network 12 to a common signal processing device 13 which is interfaced to the superior communication network 7. The sensor devices 8 and 9 measure the level of a bulk material at different points of the material surface. The sensor devices 10 and 11 measure the filling levels of different liquids 15, 16.

Figure 2:
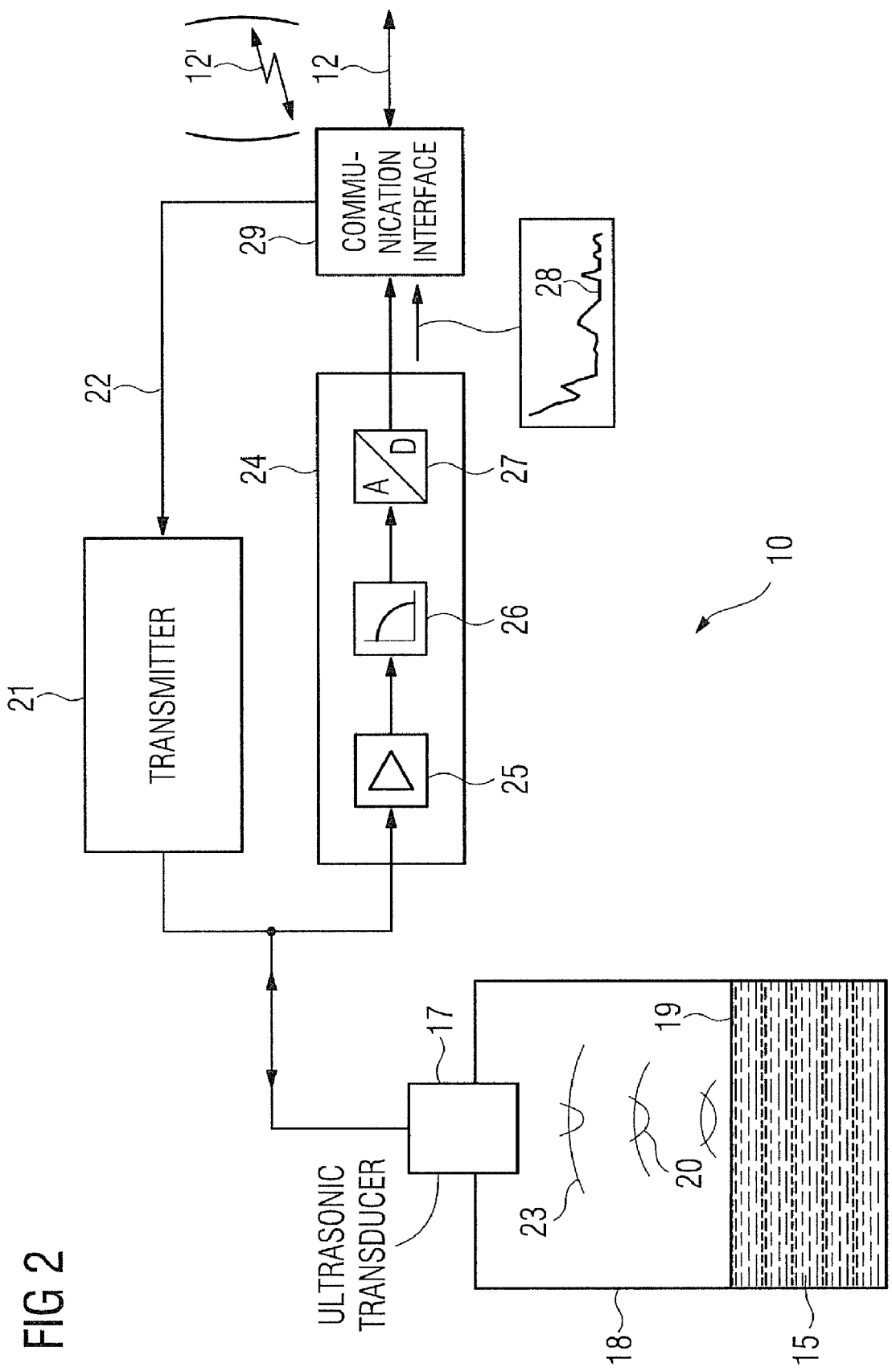
FIG. 2 shows a block diagram of a first embodiment of one of the sensor devices.

FIG. 2 shows in greater detail and as a representative example for the other sensor devices 8, 9, 11 an embodiment of the sensor device 10. While the device 10 and its operation are described in the context of an ultrasonic based pulse-echo acoustic ranging device, it should be understood that the system can also be radar based. The sensor device 10 comprises an ultrasonic transducer 17 which is installed in a tank 18 containing the liquid 15, or other type of material, with a level determined by the top surface 19 of the liquid 15. The top surface 19 of the liquid 15 provides a reflective surface which reflects ultrasonic pulses 20 generated from the transducer 17. The transducer 17 is coupled to a transmitter 21 which is controlled by an internal timer (not shown) or by a control signal 22 to excite the transducer 17 to emit the ultrasonic pulses 20 at predetermined points in time and with a predetermined frequency and amplitude. The echoes or reflected pulses 23 from the surface 19 of the liquid 15, the wall of the tank 18 and obstacles in the measurement environment (not shown) are received by the transducer 17 and converted into an electrical signal which is then fed to a receiver 24. The transmitter 21 and the receiver 24 can be implemented individually or be combined to form a transceiver. The receiver 24 comprises an amplifier 25 and an envelope detector 26 for amplifying and thereafter shaping the electrical signal output from the transducer 17. The output from the envelope detector 26 is then sampled and digitized by an analog-to-digital converter 27, thus providing a digital echo profile 28. The output of the receiver 24 is connected to the communication network 12 via a communication interface 29. This communication interface 29, which may comprise a buffer (not shown) for buffering the echo profile 28, digitally transmits the echo profile 28, if necessary together with an address information, via the communication network 12 to the signal processing device 13. Transmission may occur at predetermined time intervals or on request by the signal processing device 13. The transmitter 21 may receive the control signal 22 from the signal processing device 13 or from an adjacent sensor device, e.g. by using a token method, via the communication network 12 and the communication interface 29. As indicated by reference number 12', the communication network 12 may be of wireless type.

FIG. 3 shows in greater detail an embodiment of the signal processing device 13. The signal processing device 13 comprises a microcontroller 30 which operates under a control program stored in read-only memory (ROM) 31, utilizing parameters stored in non-volatile random access memory (NVRAM) 32, and provided with a working memory in the form of random access memory (RAM) 33. The control program includes a signal processing module 34 providing different algorithms for the different types of sensor devices 8, 9, 10, 11, which different algorithms have access to different parameter sets stored in the NVRAM 32. The microcontroller 30 is, via a first communication interface 35, connected to the communication network 12 of the level measurement system 2 for receiving the digitized echo profiles 28 from the sensor devices 8, 9, 10, 11. The microcontroller 30 is further connected to the superior communication network 7 of the process automation system 1 via a second communication interface 36. Each received digital echo profile 28 is stored in the RAM 33 for further processing by the microcontroller 30. The microcontroller 30 selects and executes a matching algorithm which identifies and verifies in the echo profile 28 the true echo from the surface 19 of the liquid 15 and calculates the range of the reflective surface 15, i.e. the time it takes for the reflected pulses 23 to travel from the reflective surface 19 to the transducer 17. From this calculation, the distance to the surface 19 of the liquid 15 and thereby the level of the liquid 15 is determined. The second communication interface 36 provides for the export of these data from the level measurement system 2 to the process controller 3 and the import of operating parameters from the process controller 3 or any other programming device (not shown) connectable to the superior communication network 7. Data may be further visualized on a display 37 of the signal processing device 13.

FIG. 4 shows an example of the sensor device 11 as another embodiment of one of the sensor devices 8, 9, 10, 11, where similar parts to those of FIG. 2 are indicated by the same reference numerals. Instead of an ultrasonic transducer 17, the sensor device 11 comprises a microwave transducer 17' which emits microwave (radar) pulses 20' and receives reflected microwave (radar) pulses 23'. In the receiver 24, the electrical signal output from the transducer 17' is digitized at an early stage (analog-to-digital converter 27) and then digitally processed, particularly by digital filtering, to the echo profile 28. This signal processing is done by a microprocessor 38 of relatively low computing power compared to those of conventional radar level transmitters or that of the signal processing device 13. The microprocessor 38 operates under a control program stored in a read-only memory (ROM) 39 and accesses a working memory in the form of random access memory (RAM) 40 for e.g. buffering the echo profile 28 before digitally transmitting the echo profile 28 via the communication network 12 to the signal processing device 13.

The invention claimed is:

1. A level measurement system, comprising:
at least two sensor devices for measuring distances to one or more materials having a surface, each sensor device comprising:
a transducer for emitting energy pulses and receiving energy pulses reflected by the surface of the material,
a transmitter being operatively coupled to said transducer for exciting the transducer to emit said energy pulses,
a receiver being operatively coupled to said transducer for generating an echo profile from the received energy pulses, and
a communication interface being operatively coupled to said receiver for transmitting the echo profile to a signal processing device;
a central signal processing device, comprising:
a controller operating under stored program control, said stored program control including a signal processing module for calculating a distance to the surface of the material based on the echo profile,
a first communication interface for receiving the echo profiles from the sensor devices, said first communication interface being operatively coupled to said controller, and
a second communication interface being operatively coupled to said controller for transmitting the calculated distances onto a superior communication network; and
a communication network coupling the at least two sensor devices to the signal processing device,
wherein the central signal processing device evaluates the echo profiles of all sensor devices.

2. The level measurement system according to claim 1, wherein one of the sensor devices is designed to use ultrasonic energy pulses.

3. The level measurement system according to claim 2, wherein the receiver of each sensor device has an analog-to-digital converter for generating the echo profile in a digital format and wherein the communication interface of each sensor device is configured to digitally transmit the echo profile.

4. The level measurement system according to claim 2, wherein the receiver of each sensor device has a sampler for generating the echo profile in form of a sequence of analog samples, and wherein the communication interface of each sensor device is configured to transmit the echo profile in an analog format.

5. The level measurement system according to claim 2, wherein the central signal processing module has different algorithms for different types of the sensor devices, wherein the different algorithms have access to different stored parameter sets.

6. The level measurement system according to claim 1, wherein one of the sensor devices is designed to use microwave energy pulses.

7. The level measurement system according to claim 6, wherein the receiver of each sensor device has an analog-to-digital converter for generating the echo profile in a digital format and wherein the communication interface of each sensor device is configured to digitally transmit the echo profile.

8. The level measurement system according to claim 6, wherein the receiver of each sensor device has a sampler for generating the echo profile in form of a sequence of analog samples, and wherein the communication interface of each sensor device is configured to transmit the echo profile in an analog format.

9. The level measurement system according to claim 6, wherein the central signal processing module has different algorithms for different types of the sensor devices, wherein the different algorithms have access to different stored parameter sets.

10. The level measurement system according to claim 1, wherein one of the sensor devices is designed to use ultrasonic energy pulses and the other one of the sensor devices is designed to use microwave energy pulses.

11. The level measurement system according to claim 10, wherein the receiver of each sensor device has an analog-to-digital converter for generating the echo profile in a digital format and wherein the communication interface of each sensor device is configured to digitally transmit the echo profile.

12. The level measurement system according to claim 10, wherein the receiver of each sensor device has a sampler for generating the echo profile in form of a sequence of analog samples, and wherein the communication interface of each sensor device is configured to transmit the echo profile in an analog format.

13. The level measurement system according to claim 1, wherein the communication network is wire-bound.

14. The level measurement system according to claim 1, wherein the communication network is wireless.

15. The level measurement system according to claim 1, wherein the receiver of each sensor device has an analog-to-digital converter for generating the echo profile in a digital format and wherein the communication interface of each sensor device is configured to digitally transmit the echo profile.

16. The level measurement system according to claim 15, wherein the receiver of each sensor device has a sampler for generating the echo profile in form of a sequence of analog samples, and wherein the communication interface of each sensor device is configured to transmit the echo profile in an analog format.

17. The level measurement system according to claim 15, wherein the central signal processing module has different algorithms for different types of the sensor devices, wherein the different algorithms have access to different stored parameter sets.

18. The level measurement system according to claim 1, wherein the receiver of each sensor device has a sampler for generating the echo profile in form of a sequence of analog samples, and wherein the communication interface of each sensor device is configured to transmit the echo profile in an analog format.

19. The level measurement system according to claim 18, wherein the central signal processing module has different algorithms for different types of the sensor devices, wherein the different algorithms have access to different stored parameter sets.

20. The level measurement system according to claim 1, wherein the central signal processing module has different algorithms for different types of the sensor devices, wherein the different algorithms have access to different stored parameter sets.

* * * * *